United States Patent [19]

Craig

[11] Patent Number: 4,750,512

[45] Date of Patent: Jun. 14, 1988

[54] FERTILIZER CONTAINER FOR SPRINKLER SYSTEM

[76] Inventor: James R. Craig, 2925 Cody St., Riverside, Calif. 92503

[21] Appl. No.: 78,165

[22] Filed: Jul. 27, 1987

[51] Int. Cl.$^4$ .............................................. B01D 11/02
[52] U.S. Cl. ..................................... 137/268; 422/276
[58] Field of Search ................ 137/268; 422/282, 281, 422/277, 276

[56] References Cited

U.S. PATENT DOCUMENTS

| | | | |
|---|---|---|---|
| 528,441 | 10/1894 | Muller | 422/277 |
| 2,135,932 | 11/1938 | Belmont | 422/277 |
| 3,323,539 | 6/1967 | Schneider | 137/268 |
| 4,662,387 | 5/1987 | King | 137/268 |

Primary Examiner—Alan Cohan
Attorney, Agent, or Firm—Willie Krawitz

[57] ABSTRACT

A container for solid fertilizer is provided, the container being inserted into a sprinkler line system. The container provides a screen to hold the fertilizer and permits water to permeate therethrough. The screen and fertilizer are secured within a screen holder having continuous or perforated side walls, depending on the type of solid fertilizer to be used, and a gapped bottom support for the screen.

Water from the sprinkler is fed into the container and is pressurized through the screen and dissolves the fertilizer. The rate of solubilization depends on the water flow, the type and solubility of the fertilizer, and the size of the perforations in the screen and gaps in the screen holder.

5 Claims, 4 Drawing Sheets

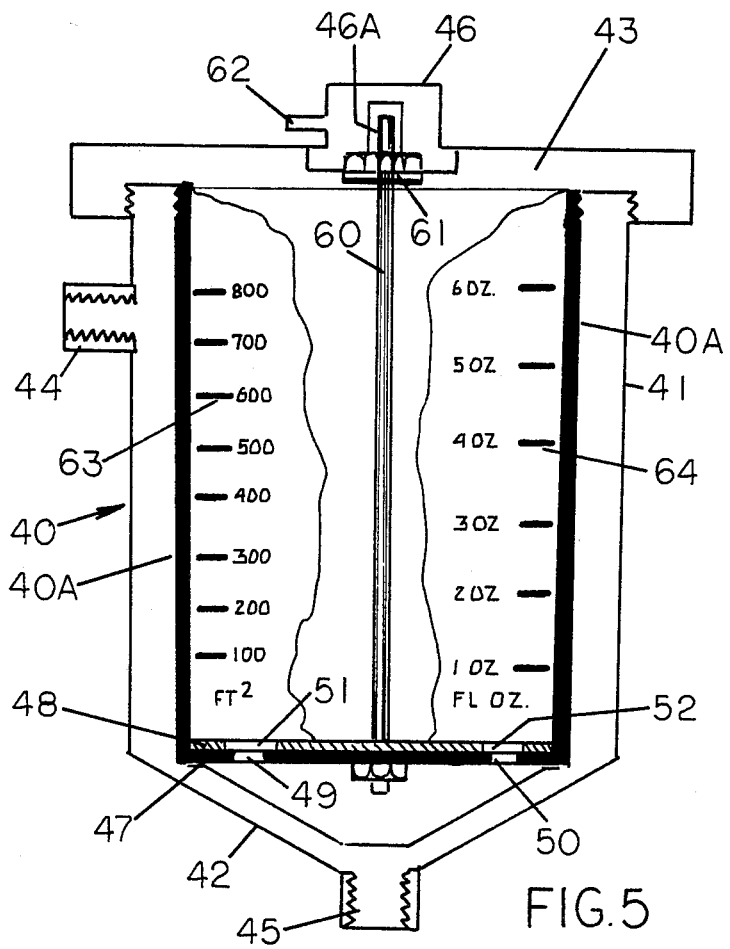
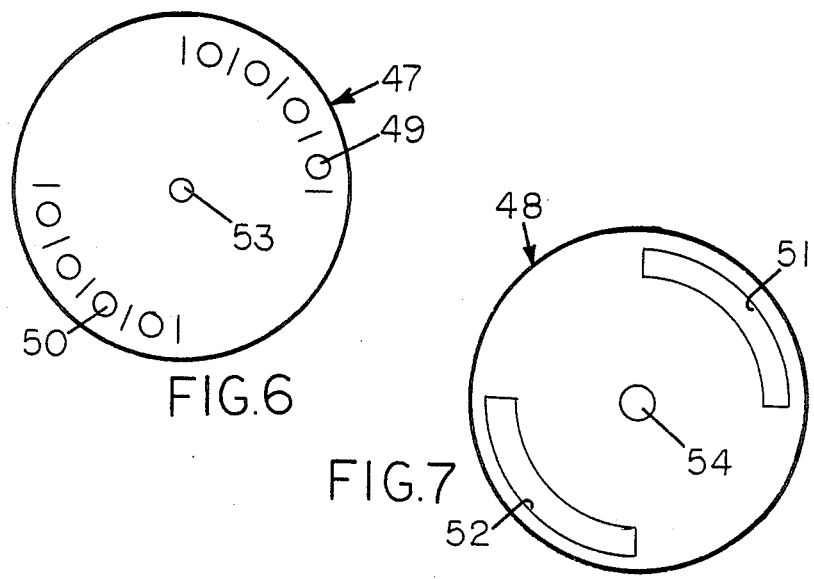
FIG.5
FIG.6
FIG.7

FERTILIZER CONTAINER FOR SPRINKLER SYSTEM

BACKGROUND OF THE INVENTION

This invention relates to a new and improved fertilizer applicator for use with sprinkler systems.

Various types of these systems have been disclosed in U.S. Pat. Nos: 2,994,561; 3,367,353; 3,375,976; 3,669,357; 3,833,177; 4,026,673; 4,456,176; 4,545,396; and, 4,635,848.

These devices tend to be cumbersome, complicated, and some require moving parts. Other devices employ meters which are in themselves expensive. Many of these components could be eliminated if the fertilizer applicator system were pre-calibrated in terms of fertilizer solubility, and outlet orifice size.

Also in many instances, it would be desirable to add liquid ingredients to the solid fertilizer when feeding into a sprinkler system. These liquid ingredients could include insecticides, herbicides, and various fertilizers which are relatively expensive such as chelates, hormones, and specialty chemicals.

THE INVENTION

According to the invention, a fertilizer container for a sprinkler system is provided, comprising a screen for containing the fertilizer, and a screen holder for the screen, the screen holder defining continuous side walls or perforated or slotted side walls, and a perforated or slotted bottom support for the screen. A container or enclosure case for the screen and screen holder is employed, and provides a water inlet, and an outlet for dissolved fertilizer, the outlet connecting into the sprinkler system.

The perforations of the screen and screen holder are sized to permit a water pressure build up within the enclosure case and force water from the inlet of the enclosure case through the screen to dissolve the fertilizer.

If desired, liquid ingredients such as insecticides, soil penetrants, weedicides, fertilizers, etc., can be added to the solid fertilizer and be absorbed thereby, without dripping through the enclosure case. When water is fed through the fertilizer, the liquids will, of course, be simultaneously removed. This obviates the problem of providing extra equipment for the application of different liquids, besides saving time.

BRIEF DESCRIPTION OF THE DRAWINGS

FIG. 5 is a cross sectional view in side elevation showing another embodiment of this invention for supplying liquid to a sprinkler system; and, FIGS. 6 and 7 are plan views of the bottom perforated drain elements employed in the embodiment shown in FIG. 5.

DESCRIPTION OF THE PREFERRED EMBODIMENTS

Figure 1:
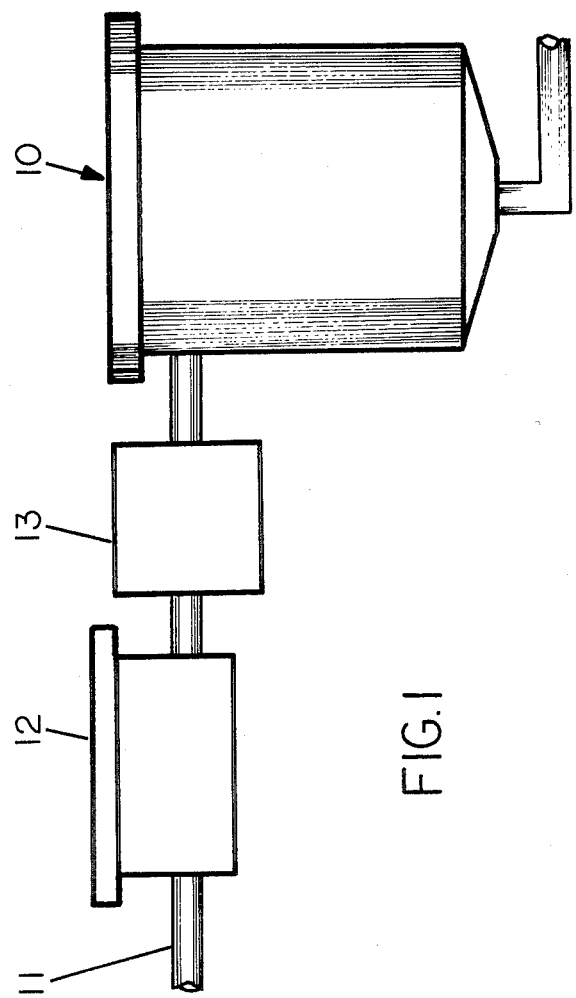
FIG. 1 is a system flow diagram showing the device installed in a water sprinkler system.

The fertilizer device 10 of this invention is shown in diagrammatic form, in FIG. 1 installed in a sprinkler system including conventional components such as a water inlet line 11, an anti-siphon valve 12, and a turn on valve 13 which precedes the device 10.

Figure 2:
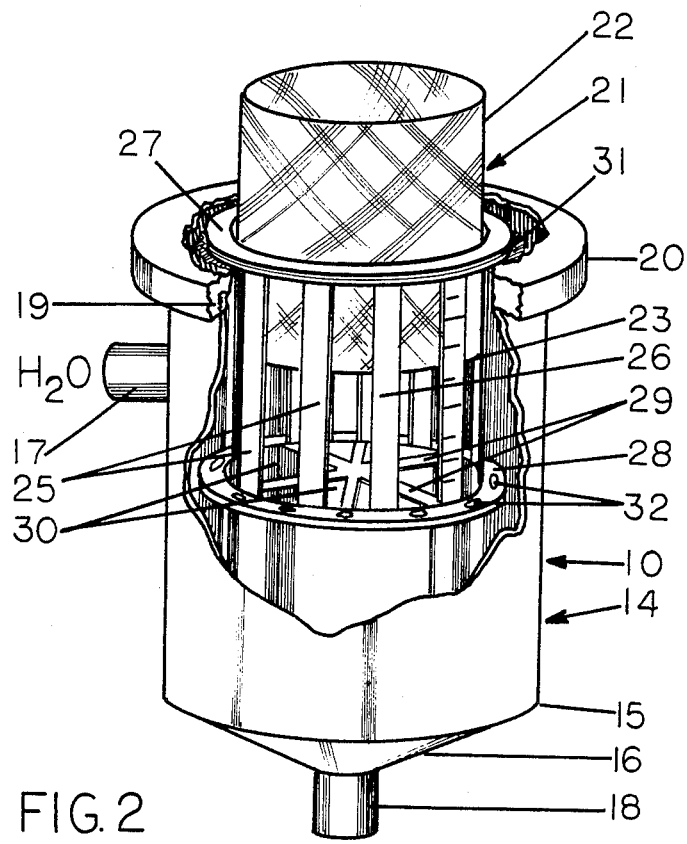
FIG. 2 is an external perspective view, partly exploded, of the device of this invention.

As shown in greater detail in FIG. 2, the device 10 comprises an enclosure case 14 constructed of, say a plastic material such as PVC. The case includes a sidewall portion 15, lower conical bottom 16, water inlet 17, and an outlet 18 for the dissolved fertilizer solution. The upper end of the outer sidewall 15 is threaded 19 to engage a cover plate 20.

A fertilizer screen 21 is shown for containing fertilizer in the form of either solid crystals or granules. The screen may be constructed of fine mesh, stainless steel, teflon fabric, etc., and is configured as a cylinder body 22 and retaining bottom 23. The screen 21 is contained within a screen holder 25, including integrally molded, segmented sidewalls 26 joined at each end with circular end pieces 27 and 28. The bottom of the screen holder provides a plurality of support members 29 having gaps 30 therebetween. The end piece 27 is threaded 31 to engage the cover plate 20.

A plurality of water orifices 32 are employed to drain water from the wall area of the device when fertilizer is loaded in the screen. When the sprinkler system is being used, but with no fertilizer being present, the drainage effect of these orifices 32 is reduced considerably compared to the gaps 30.

The embodiment shown in FIG. 2 is principally for use with a solid cake of fertilizer, where greater penetration of the cake by water through the sidewalls 26 is necessary. The gaps 30 can be presized to permit a greater or lesser flow of water there-through. This in turn affects the solubilization rate of the fertilizer cake.

Figure 4:
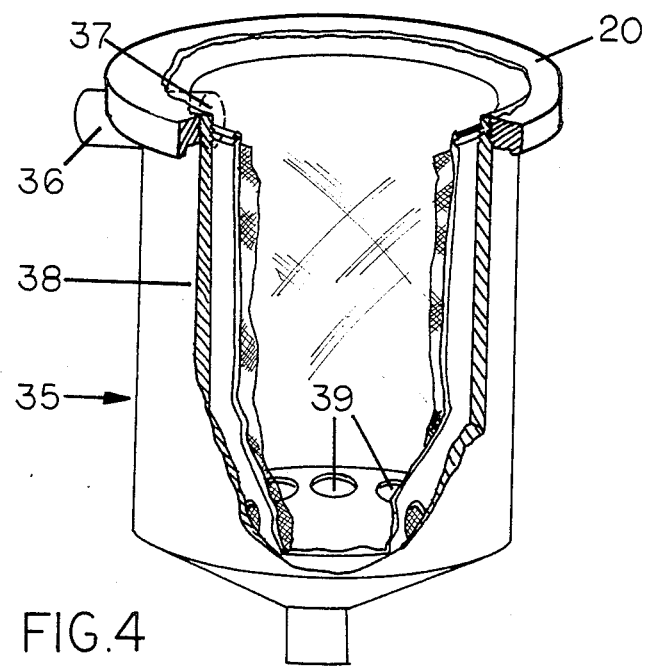
FIG. 4 is a sectional side elevation view of the device adapted for use with fertilizer pellets, granules, powder, etc.
Figure 3:
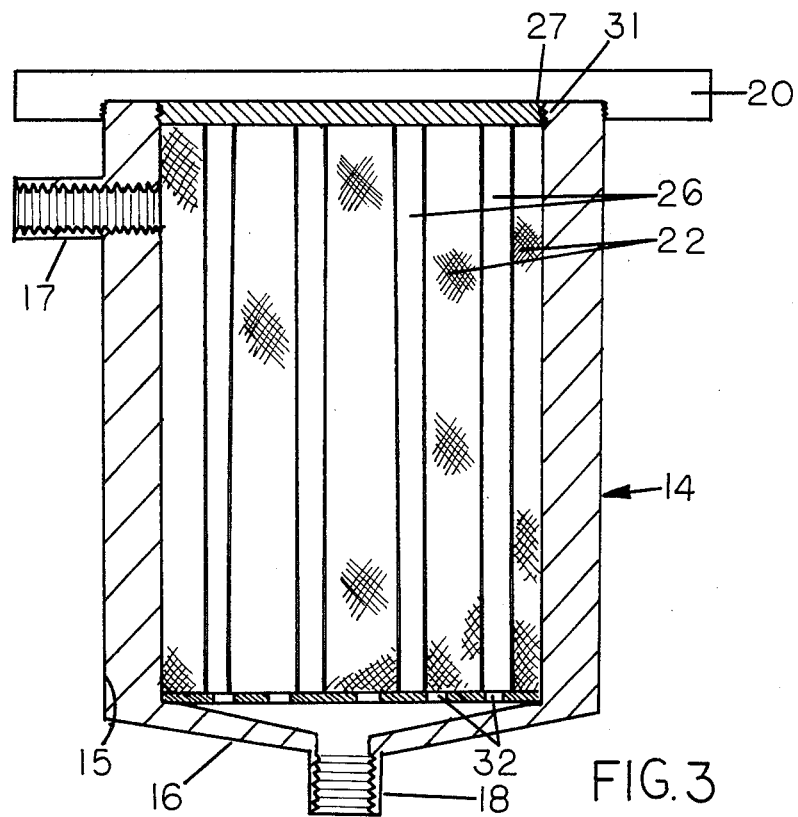
FIG. 3 is a cross sectional view in side elevation of the assembled device.

If pellets are used as the fertilizer, a solid sidewall is preferably used as shown in the device 35 in FIG. 4. In this latter case, the water inlet 36 feeds into a corresponding opening 37 near the upper end of the sidewall 38, and a series of small (e.g. 5/32 ") outlet orifices 39 are provided for the leached fertilizer solution at the lower portion of the sidewall and bottom.

As shown in FIG. 2, when water is fed into the system, it pressures the interior of the enclosure case 14 and is forced between the segmented sidewalls 26 and through the screen into the fertilizer cake. Dissolved fertilizer passes through the gaps 30 of the support members 29 and the outlet 18.

Also, as indicated, liquids such as insecticides, weedicides, fertilizers, etc., can be poured onto, and be absorbed by the solid cake, pellets, powder, etc., and this enables use of a wider spectrum of materials which can be applied, without changing the equipment.

In FIGS. 5, 6 and 7, an embodiment is shown for supplying liquid fertilizer to a sprinkler system. The container 40 is shown constructed of a transparent or transluscent plastic, and includes a sidewall portion 41, conical bottom 42, and top 43 which is threadably attached to the sidewall. An upper inlet 44 and lower outlet 45 are integrally formed when the device is injection molded, and are internally threaded for connection to the sprinkler system.

A control knob 46 having an internally recessed portion 46a is formed or attached to the top 43. An interior container 40a threaded in container 40 provides a bottom comprising superposed drain elements 47, 48 which are perforated 49, 50, 51 and 52. Central bores 53, 54 are formed in the drain elements 47, 48, respectively.

A control rod 60 is positioned within recessed portion 46a of the control knob 46, and is bolted through the central bores 53, 54 to the underside of drain element 47.

An elliptically shaped flange member 61 is fitted into the upper end of the control rod 60, and contacts the control knob 46. Consequently, when the control knob is rotated, the drain element 48 will be rotated to expose a greater or lesser number of orifices 50 to the passage of fertilizer liquid. A pointer element 62 is provided on the control knob 46 to correspond with flow levels desired through the exposed orifices 49, 50. Scales 63, 64 may be printed onto the sidewall of the container to indicate volume and/or weight of the liquid inside the container 40A.

I claim:

1. A fertilizer applicator for a sprinkler system, comprising:
   A. a screen for holding solid fertilizer;
   B. a screen holder for containing the screen, including:
      i. integrally formed upper and lower end flange members and sidewall elements joined thereto, the said elements providing openings for water to pass therethrough at a controlled rate and dissolve the fertilizer, the lower flange member being perforated to permit water to drain therethrough; and,
      ii. a bottom support member for the screen, the support member having a plurality of sized openings to permit dissolved fertilizer to pass therethrough at a controlled rate;
   C. a case member, including:
      i. a sidewall portion for enclosing the screen holder and contained screen therein;
      ii. the case member being removeably secured to the upper flange member of the screen holder, thereby spacing the sidewall of the case member and the sidewall elements of the sreeen holder;
      iii. the case member providing inlet and outlet means for water and diluted fertilizer solution, respectively; whereby,
      i. water fed into the inlet will be pressured between the sidewall of the case, through the sidewall elements of the screen holder and into the screen to dissolve the fertilizer;
      ii. water draining from the perforations in the lower flange member will dilute the dissolved fertilizer solution to reduce fertilizer burning; and,
      iii. when the solid fertilizer is dissolved, water is passed principally through openings of the bottom support member and the outlet of the applicator, and then to the sprinkler system.

2. The fertilizer applicator of claim 1, in which the case member provides a top member for engaging the sidewall and for securing the upper flange of the screen holder thereto.

3. The fertilizer applicator of claim 1, in which the solid fertilizer contains a liquid absorbed therein.

4. The fertilizer applicator of claim 3, in which the liquid is selected from the class consisting of: insecticides, fungicides, weedicides, herbicides, plant growth regulants, hormones, soil penetrants and fertilizers.

5. A fertilizer applicator for a sprinkler system, comprising:
   A. a screen for holding solid fertilizer;
   B. a screen holder for containing the screen, including:
      i. integrally formed upper and lower end flange members and a continuous sidewall joined thereto, the said sidewall providing openings for water to pass therethrough at a controlled rate and dissolve the fertilizer, the lower flange member being perforated to permit water to drain therethrough; and,
      ii. a bottom support member for the screen, the support member having plurality of sized openings to permit dissolved fertilizer to pass therthrough at a controlled rate;
   C. a case member, including:
      i. a sidewall portion for enclosing the screen holder and contained screen therein;
      ii. the case member being removably secured to the upper flange member of the screen holder, thereby spacing the sidewall of the case member and the sidewall elements of the screen holder;
      iii. the case member providing inlet and outlet means for water and diluted fertilizer solution, respectively; whereby,
      i. water fed into the inlet will be pressured between the sidewall of the case, through the sidewall elements of the screen holder and into the screen to dissolve the fertilizer;
      ii. water draining from the perforations in the lower flange member will dilute the dissolved fertilizer solution to reduce fertilizer burning; and,
      iii. when the solid fertilizer is dissolved, water is passed principally through openings of the bottom support member and the outlet of the applicator, and then to the sprinkler system.

* * * * *